US007653469B2

(12) United States Patent
Bai et al.

(10) Patent No.: US 7,653,469 B2
(45) Date of Patent: Jan. 26, 2010

(54) AUTOMATIC TRANSMISSION SHIFT POINT CONTROL SYSTEM AND METHOD OF USE

(75) Inventors: Shushan Bai, Ann Arbor, MI (US); Kumaraswamy V. Hebbale, Troy, MI (US); Chunhao J. Lee, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 359 days.

(21) Appl. No.: 11/459,703

(22) Filed: Jul. 25, 2006

(65) Prior Publication Data

US 2008/0027613 A1 Jan. 31, 2008

(51) Int. Cl.
*G06F 17/00* (2006.01)

(52) U.S. Cl. ............................ 701/55; 701/51; 477/107

(58) Field of Classification Search .................. 701/51, 701/55; 477/107

See application file for complete search history.

(56) References Cited

U.S. PATENT DOCUMENTS

| | | | | | |
|---|---|---|---|---|---|
| 5,156,444 | A | * | 10/1992 | Franzke | 303/122.05 |
| 5,519,610 | A | * | 5/1996 | Tsutsui et al. | 701/51 |
| 5,527,234 | A | * | 6/1996 | Kroeger | 477/80 |
| 5,748,472 | A | * | 5/1998 | Gruhle et al. | 701/51 |
| 5,908,461 | A | * | 6/1999 | Tsukamoto et al. | 701/56 |
| 5,995,895 | A | * | 11/1999 | Watt et al. | 701/50 |
| 6,019,701 | A | * | 2/2000 | Mori et al. | 477/46 |
| 6,496,767 | B1 | * | 12/2002 | Lorentz | 701/55 |
| 6,597,979 | B2 | * | 7/2003 | Hagiwara et al. | 701/67 |
| 6,684,144 | B2 | * | 1/2004 | Sekii et al. | 701/51 |
| 6,843,755 | B2 | * | 1/2005 | Estebanez et al. | 477/107 |
| 6,984,191 | B2 | * | 1/2006 | Kuwata et al. | 477/97 |
| 7,044,887 | B2 | * | 5/2006 | Tanaka et al. | 477/115 |
| 7,354,378 | B2 | * | 4/2008 | Ochi et al. | 477/115 |
| 2003/0186780 | A1 | * | 10/2003 | Estebanez et al. | 477/107 |
| 2008/0027613 | A1 | * | 1/2008 | Bai et al. | 701/55 |

* cited by examiner

*Primary Examiner*—Thomas G Black
*Assistant Examiner*—Wae Louie

(57) ABSTRACT

An automatic transmission control system for controlling gear shifting in an automatic transmission in a motor vehicle having an automatic transmission in a motor vehicle in operative communication with a transmission control unit, the transmission control unit has adaptive gearshift logic that operates to compensate for variations in vehicle conditions and road conditions, wherein the transmission control unit outputs at least one gearshift command to the transmission to control shifting of gears in accordance with the adaptive gearshift logic. A control method uses the adaptive gearshift logic to control gear shifting within the transmission in accordance with adaptive gearshift points that compensate for variations in vehicle conditions and road conditions.

6 Claims, 5 Drawing Sheets

54

Power-On Modifier Look-Up Table

| Accel. Deviation ($\Delta\alpha$) | Beta ($\beta$) |
|---|---|
| -50 | 0 |
| 0 | 0 |
| 2 | 0 |
| 10 | 0.2 |
| 25 | 0.5 |
| 50 | 1 |

Power-Off Modifier Look-Up Table

| Accel. Deviation ($\Delta\alpha$) | Beta ($\beta$) |
|---|---|
| -50 | 1 |
| -25 | 0.5 |
| -10 | 0.2 |
| -2 | 0 |
| 0 | 0 |
| 50 | 0 |

*FIG. 8*

AUTOMATIC TRANSMISSION SHIFT POINT CONTROL SYSTEM AND METHOD OF USE

TECHNICAL FIELD

The present invention is related to gearshift scheduling of automatic transmissions. More particularly, the invention relates to control of gear shifting in automatic transmissions based on generated adaptive shift points that compensates for varying vehicle and road conditions.

BACKGROUND OF THE INVENTION

A conventional gearshift schedule for automatic transmissions is implemented in the form of shift maps. A shift map is a group of table-lookup functions, which define gearshift points based on vehicle speed and throttle opening. Consequently, each gearshift point defined using conventional gearshift scheduling is a function of vehicle speed and throttle opening, and does not compensate for varying vehicle conditions, such as varying vehicle loads and associated trailering, or road conditions such as road grade and curvature. However, it is desirable to dynamically generate gearshift points that use a combination of inputs that compensate for varying vehicle and road conditions to achieve optimal fuel economy, performance, and driveability.

SUMMARY OF THE INVENTION

Generally provided is an automatic transmission control system for controlling gear shifting in an automatic transmission in a motor vehicle having an automatic transmission in a motor vehicle in operative communication with a transmission control unit; and a transmission control unit having associated adaptive gearshift logic that operates to compensate for variations in vehicle conditions and road conditions, wherein the transmission control unit outputs at least one output command to the automatic transmission to control shifting of gears in the automatic transmission in accordance with the adaptive gearshift logic.

In accordance with an embodiment of the invention, a method for controlling an automatic transmission includes providing an automatic transmission controlled by a transmission control unit, wherein the transmission control unit has associated adaptive gearshift logic; and using the associated adaptive gearshift logic to control gear shifting within the transmission in accordance with generated adaptive gearshift points that compensate for variations in vehicle conditions and road conditions.

BRIEF DESCRIPTION OF THE DRAWINGS

These and other aspects of the present invention will be more fully understood with reference to the description herein below and the following drawings in which:

FIG. 7 is a Power-On Modifier Look-Up Table in accordance with one embodiment of the invention;

FIG. 8 is a Power-Off Modifier Look-Up Table in accordance with one embodiment of the invention;

DESCRIPTION OF THE PREFERRED EMBODIMENT

In general, a system and control method of the present invention provides for adaptive gearshift scheduling of automatic transmissions. The adaptive gearshift scheduling system and control method in accordance with one embodiment of the invention are based on optimal gearshift points that compensate for varying vehicle and road conditions to achieve optimal fuel economy, performance and drivability.

A control method of using the adaptive gearshift scheduling system takes into account vehicle conditions, such as load and trailering, and road conditions, such as grade and curvature, to generate a corresponding optimal shift points. Thus, the system and method of the present invention dynamically generates gearshift points to compensate and adapt shifting of gears within the transmission to current vehicle and road conditions.

In particular, the invention provides an adaptive gearshift scheduling system for automatic transmissions in motor vehicles and an associated control method to generate an adaptive gearshift schedule. Current vehicle acceleration changes are proportional to variations in vehicle and road conditions. Thus, a deviation in vehicle acceleration can be used to modify the gearshift points when vehicle and road conditions change. In addition, other signals input into the system of the present invention, such as brake, throttle opening rate, and the like may be used to adapt the gearshift schedule to various changes in vehicle and road conditions.

Figure 1:
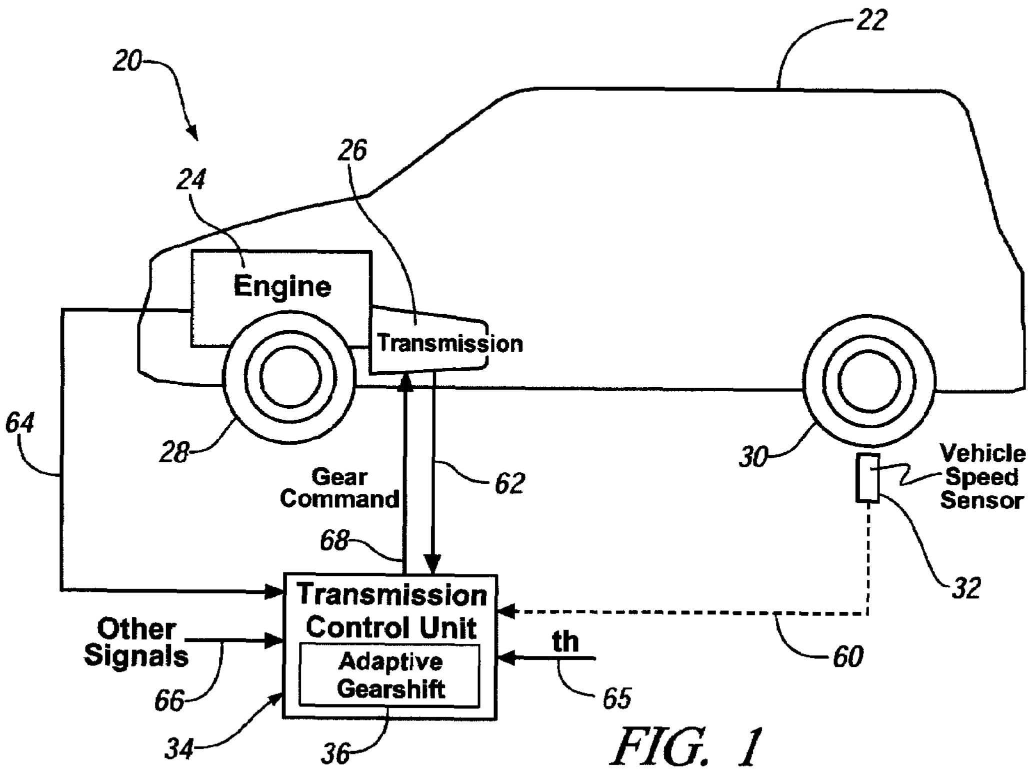
FIG. 1. is a system diagram of an adaptive gearshift scheduling system having adaptive gearshift logic in accordance with one embodiment of the invention.

FIG. 1 illustrates an automatic transmission control system 20 for controlling gear shifting in an automatic transmission in a motor vehicle 22 based on adaptive gear shift points. The system 20 is located in an automobile 22 having at least two front wheels 28 and at least two rear wheels 30 and includes an engine 24 coupled to a transmission 26 in operative communication with a transmission control unit 34, wherein the transmission control unit 34 receives a plurality of input signals and transforms the input signals into at least one or more gearshift command output signals 68 for communication of adaptive gearshift data generated by adaptive gearshift control logic to the transmission 26.

The transmission control unit 34 is in operative communication with and receives signals from a vehicle speed sensor 32 and other components and systems including a throttle control system (throttle control system not shown) and a brake system (brake system not shown).

In operation, the engine 24 communicates one or more engine signals 64 including at least one engine torque signal and at least one engine speed signal as outputs from the engine to the transmission control unit 34 as inputs to the transmission control unit 34. Additionally, the transmission 26 communicates one or more transmission signals 62 including at least one transmission input speed signal and at least one transmission output speed signal as outputs from the transmission to the transmission control unit 34 as inputs thereto. Additionally, at least one throttle position signal 65 is input into the transmission control unit 34 from the throttle control system. At least one vehicle speed signal 60 is communicated as an output from one or more vehicle speed sensors 32 to the transmission control unit 34 as an input. Other dynamic signals 66 such as, but not limited to a brake signal from a brake system are also communicated from respective other systems as inputs signals into the transmission control unit 34.

Once communicated to the transmission control unit 34, the input signals including signals 60, 62, 64, 65, and 66, are then communicated as inputs into adaptive gearshift logic 36 provided within the transmission control unit 34. The adaptive gearshift logic 36 uses the inputs to generate a gear command 68 based on an adaptive gearshift map 98 (shown in FIG. 10) that is communicated from the transmission control unit 34 to the transmission 26. The adaptive gearshift logic 36 operates to control gear shifting within the transmission in accordance with an adaptive gearshift map that compensates for variations in vehicle conditions and road conditions.

Figure 10:
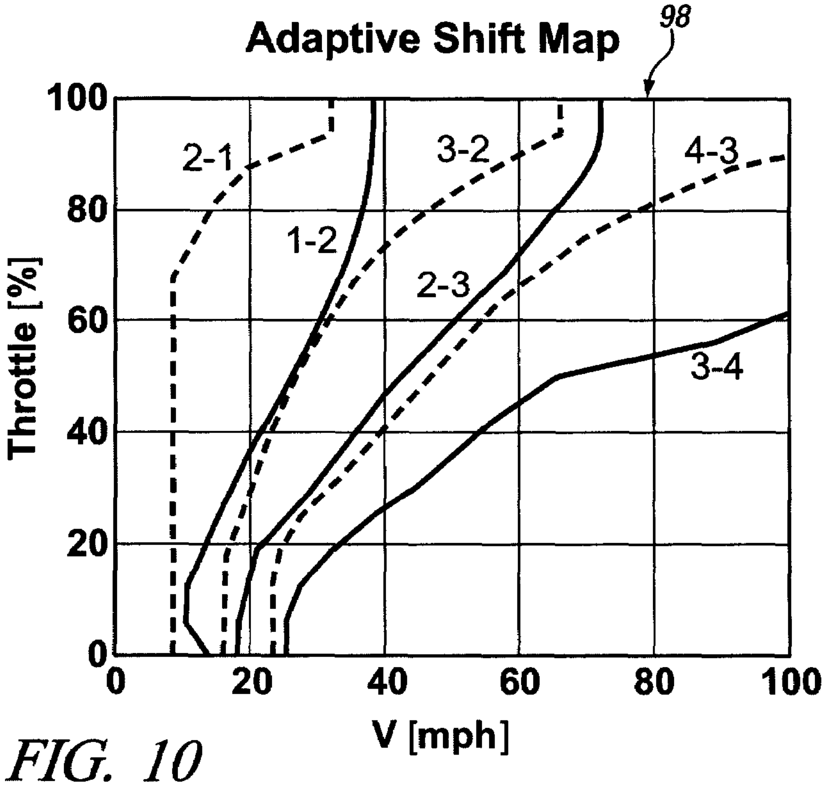
FIG. 10 is an adaptive shift map generated using the adaptive gearshift schedule system and control method in accordance with one embodiment of the invention

A non-limiting example of an optimal shift map for a particular vehicle condition is shown in FIG. 10 illustrating optimal shift point shift map 98 plotting downshift and upshift curves representing a percent of throttle opening along a Y axis versus vehicle speed in miles per hour along the X axis.

Figure 2:
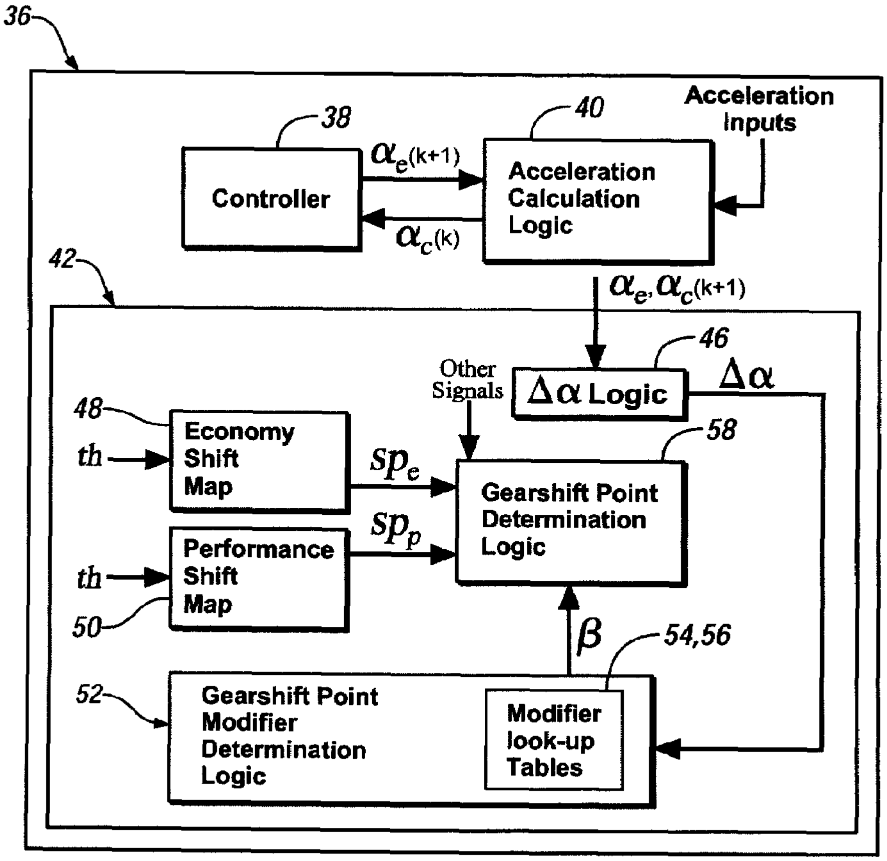
FIG. 2 is an enlarged view of the adaptive gearshift logic shown in FIG. 1 in accordance with one embodiment of the invention.

FIG. 2 illustrates a more detailed view of the adaptive gearshift logic 36 shown in FIG. 1. More particularly, FIG. 2 illustrates a system flow diagram of an acceleration calculation logic unit 40, a controller 38 in operative electrical communication with the acceleration calculation logic unit 40, and an adaptive gearshift map determination logic unit 42.

More particularly, the controller 38 has at least one Kalman Filter used to process acceleration related input signals in order to determine an associated current vehicle acceleration value. The controller 38 cooperates with the acceleration calculation logic unit 40 to calculate current vehicle acceleration using a recursive set of equations to calculate current vehicle accelerations values sampled at predefined times.

The gearshift map determination logic 42 provides an economy shift map 48, a performance shift map 50, an adaptive gearshift point modifier determination logic 52, a gearshift point determination logic 58, and a vehicle acceleration deviation logic 46.

Figure 5:
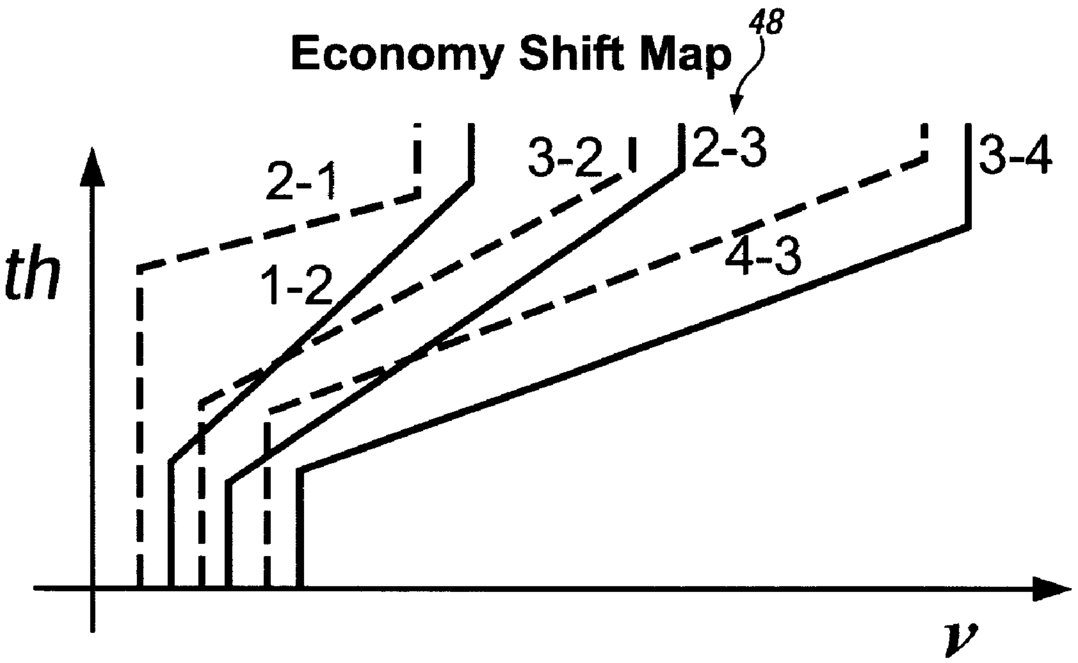
FIG. 5 is an example of an economy shift map in accordance with one embodiment of the invention.
Figure 6:
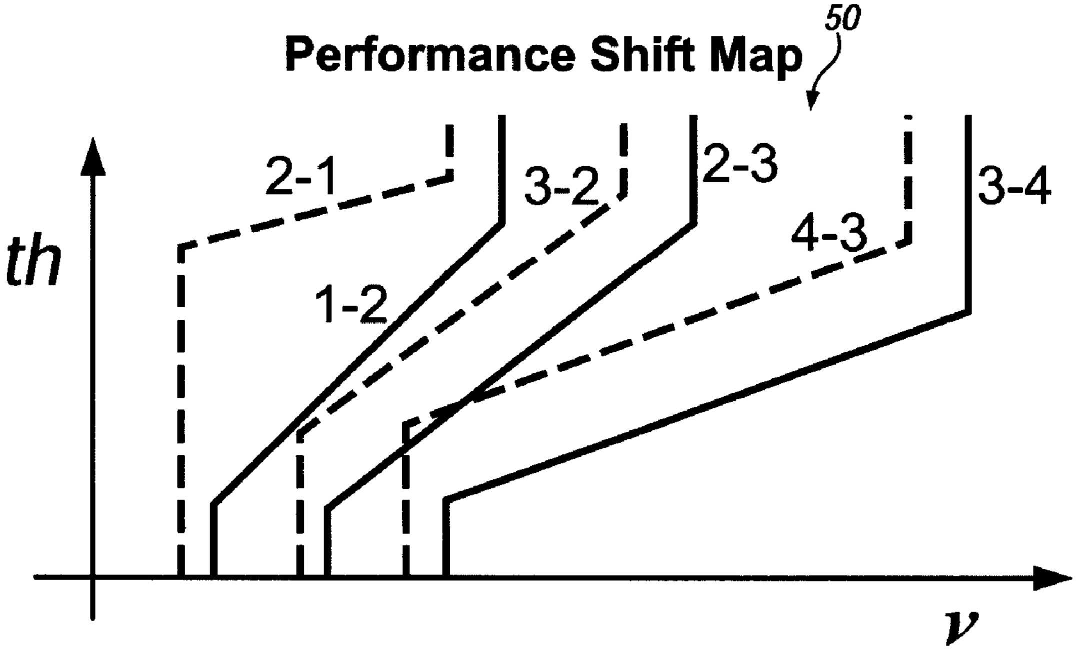
FIG. 6 is a is a performance shift map in accordance with one embodiment of the invention.

FIG. 5 illustrates a more detailed view of an example of the economy shift map 48 shown in FIG. 2. FIG. 6 illustrates a more detailed view of an example of a performance shift map 50 shown in FIG. 2.

Each of the shift maps 48, 50 provide a Y-axis representing a percentage of throttle opening and an X-axis representing vehicle speed. The dashed lines represent shift point curves corresponding to down-shifting and the solid lines represent shift point curves representing up-shifting as will be appreciated by one of ordinary skill in the art.

The economy shift map 48 and the performance shift map 50 illustrate conventional shift maps, which each operate to map throttle opening associated with corresponding vehicle speed to gearshift points for determining up- and down-shifts associated with each gear position within the transmission 26.

The economy shift map 48 is based on shift schedules that correspond to fuel economy, wherein the optimal fuel economy is achieved through specified economy shift points $sp_e$. The economy shift map defines a plurality of economy shift points, at which the engine is most efficient to achieve optimal fuel economy.

The performance shift map 50 is based on maximum power conditions associated with a corresponding throttle and speed condition. The performance shift map defines a plurality of shift points $sp_p$, which each provides a best performance at a maximum power condition.

The adaptive gearshift point modifier determination logic 52 is used to determine a gearshift point modifier β based on vehicle acceleration deviation and position of the throttle. The gearshift point modifier determination logic 52 provides one or more modifier lookup tables 54, 56. The gearshift point modifier determination logic 52 determines the value of the modifier β, which ranges from 0 to 1.

In one embodiment of the invention, β is selected from a look-up table such as one of the power-on or power-off look-up tables shown in FIGS. 7-8. An example of the power-on modifier lookup table is shown in FIG. 7. An example of the power-off modifier lookup table is shown in FIG. 8.

In an embodiment shown in FIG. 7, a power-on modifier lookup table 54 is provided, wherein the power-on modifier lookup table includes gearshift point modifier values each corresponding to an associated vehicle acceleration deviation value. In an embodiment shown in FIG. 8, a power-off modifier lookup table 56 is provided, wherein the power-off modifier lookup table includes gearshift point modifier values each corresponding to an associated acceleration deviation value.

A method of using the adaptive gearshift logic 36 is provided to generate the adaptive gear shift map 98 from a combination of at least one economy shift map 48 and at least one performance shift map 50, wherein the adaptive gear shift map 98 defines an adaptive gear shift schedule. The adaptive gear shift map 98 is defined by a plurality of optimal or adaptive shift points forming adaptive shift curves, wherein each of the plurality of adaptive shift points is calculated from a corresponding economy shift point, and from a corresponding performance gear shift point. The corresponding economy shift point is selected from an economy shift map, and the corresponding performance shift point is selected from a performance shift map. Inputs into each of the shift maps 48, 50, respectively include throttle signals indicating throttle positions as a percentage of throttle opening, vehicle speeds, and gear shifting data and are then used to generate a plurality of adaptive shift points on an adaptive gearshift point map.

In general, a method of controlling an automatic transmission in a motor vehicle includes: providing an automatic transmission controlled by a transmission control unit, wherein the transmission control unit has associated adaptive gearshift logic; and using the associated adaptive gearshift logic to control gear shifting within the transmission in accordance with an adaptive gear shift map that compensates for variations in vehicle conditions and road conditions.

An adaptive gear shift map for a particular vehicle or road condition is generated from a combination of at least one economy shift map and at least one performance shift map, wherein the adaptive gear shift map defines an adaptive gear shift schedule.

Adaptive shift points defining the gear shift map are each calculated from a corresponding economy shift point, and from a corresponding performance gear shift point to define adaptive shift point associated with the adaptive gearshift map. The economy shift point is selected from an economy shift map, and the performance shift point is selected from a performance shift map. The values for the economy shift point and the performance shift point are then modified by a modifier in accordance with an adaptive gearshift point determination calculation to determine the adaptive gearshift point.

Initially, a vehicle acceleration deviation is calculated based on a difference between an estimated nominal vehicle acceleration and a current vehicle acceleration. The estimated nominal vehicle acceleration is based on vehicle speed and predefined nominal vehicle and road conditions, such as one occupant (i.e. driver only) in a vehicle and a level road. The current vehicle acceleration is calculated using the controller. The controller may use any suitable filtering method to determine the current vehicle acceleration. Preferably, a Kalman Filter may be used in one embodiment of the invention to determine the current vehicle acceleration.

Once the estimated nominal vehicle acceleration and the current vehicle acceleration values are determined, the acceleration deviation is set equal to a difference between the estimated nominal vehicle acceleration and the current vehicle acceleration. The calculated vehicle acceleration deviation is then used to determine a gearshift point modifier value. The value of the modifier may be determined by using look-up tables or by using fuzzy logic.

The gearshift modifier value ranges between and includes values from 0 to 1 and operates to modify both the economy gearshift point and the performance gearshift point in accordance with a gearshift point determination calculation. When the modifier value equals zero, the calculated shift point equals the value of the corresponding economy shift point, and when the modifier value equals one, the calculated shift point equals the value of the corresponding performance shift point.

Once the gearshift point determination calculation is performed, an optimal or adaptive gearshift point is determined and is used to generate an adaptive gearshift map. The adaptive gearshift map may be dynamically created in accordance with variances in the vehicle acceleration deviation.

Figure 3:
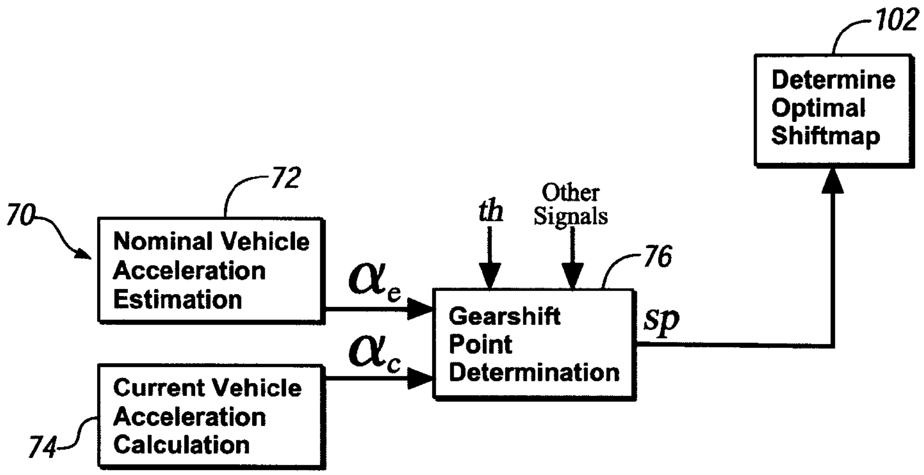
FIG. 3 is a flow chart illustrating a method of using the adaptive gearshift scheduling system shown in FIG. 1 in accordance with one embodiment of the invention.

Referring in general to FIG. 3, FIG. 3 provides a method 70 of using the adaptive gearshift logic 36 shown in FIG. 1. FIG. 3 illustrates a block diagram of a flow chart representing the operation of the shift point logic 36.

Initially, acceleration related inputs including engine torque, engine speed, transmission input speed, current gear information, and transmission output speed are input into the controller 38 for processing of the acceleration inputs. The acceleration inputs are then communicated to the acceleration calculation logic unit 40 to calculate a nominal vehicle acceleration estimation value $\alpha_e$ and a current vehicle acceleration value $\alpha_c$. The $\alpha_e$ and $\alpha_c$ values are then communicated as inputs into the gearshift map determination logic 42.

In operation, the $\alpha_e$ and $\alpha_c$ values are communicated to the vehicle acceleration deviation logic unit 46 and a vehicle acceleration deviation calculation is performed.

The method 70 of using the shift point logic 36 includes calculating a nominal vehicle acceleration estimation (72) and calculating a current vehicle acceleration value (74) to generate $\alpha_e$, and $\alpha_c$ respectively.

Referring to FIGS. 2-3, the acceleration calculation logic 40 calculates a nominal vehicle acceleration estimation value $\alpha_e$ (72) by estimating the nominal vehicle acceleration based on predefined nominal conditions including current engine torque, and a specified load in the vehicle, and predefined road conditions including a level road.

One embodiment of the nominal vehicle acceleration estimation calculation is shown in Equation 1.

$$\alpha_e=(T_e \cdot K_t \cdot GR \cdot FR/R_w - F_0 \cdot M_v \cdot g - F_1 \cdot v - F_2 v^2)/M_v \quad (1)$$

Wherein, $\alpha_e$ is the estimated nominal vehicle acceleration, $T_e$ is the current engine torque, $K_t$ is the current torque ratio of torque converter, GR is the current gear ratio, FR is the final drive ratio, $R_w$ is the wheel radius, v is the vehicle speed, g is the acceleration of gravity, $M_v$ is the nominal vehicle mass assuming no additional load or passengers, and $F_0$, $F_1$ and $F_2$ are the zero, first and second order vehicle resistance coefficients, respectively.

The current vehicle acceleration calculation logic 40 calculates the current vehicle acceleration (74) by inputting current vehicle speed signal inputs into the logic unit 40. One embodiment of a current vehicle acceleration calculation performed using a Kalman Filter as is well known in field of control arts.

In an embodiment of the invention wherein the Kalman Filter filters current vehicle acceleration signal inputs in accordance with the following Equations 2-5:

$$\text{speed}(k+1)=\text{speed}(k)+T^*\alpha_c(k)+K\text{gain1}^*\text{residue} \quad (2)$$

$$\alpha_c(k+1)=\alpha_c(k)+T^*\text{jerk}(k)+K\text{gain2}^*\text{residue} \quad (3)$$

$$\text{jerk}(k+1)=\text{jerk}(k)+K\text{gain3}^*\text{residue} \quad (4)$$

$$\text{residue}=\text{measured speed}(k+1)-\text{speed}(k)-T^*\alpha_c(k) \quad (5)$$

Wherein Kgain1, Kgain2, Kgain3 are Kalman Filter gains, wherein the Kalman Filter Gains are determined from a discrete Kalman Filter design assuming noise characteristics for the measurement process and sensor, speed(k+1), acc(k+1), Jerk(k+1) are estimates of the speed, acceleration, and jerk at time k+1, wherein jerk equals a rate of change of acceleration $\alpha_c$ and wherein T is the sampling interval.

Initially, the variable k is initialized to zero to determine an initial value for $\alpha_c$, wherein $\alpha_c(1)$ equals Kgain2*residue at k=0 for a constant sampling time T. Speed and acceleration at k=0 are also initialized to zero. The calculations disclosed in equations 2-5 are solved in a recursive manner, wherein a last calculated value of $\alpha_c(k)$ is used to generate a most recent value of $\alpha_c$ at k+1.

The value for the vehicle acceleration deviation, $\Delta\alpha$ is then input into the gearshift point modifier determination logic 52 to determine a gearshift point modifier value using the vehicle acceleration deviation.

Figure 4:
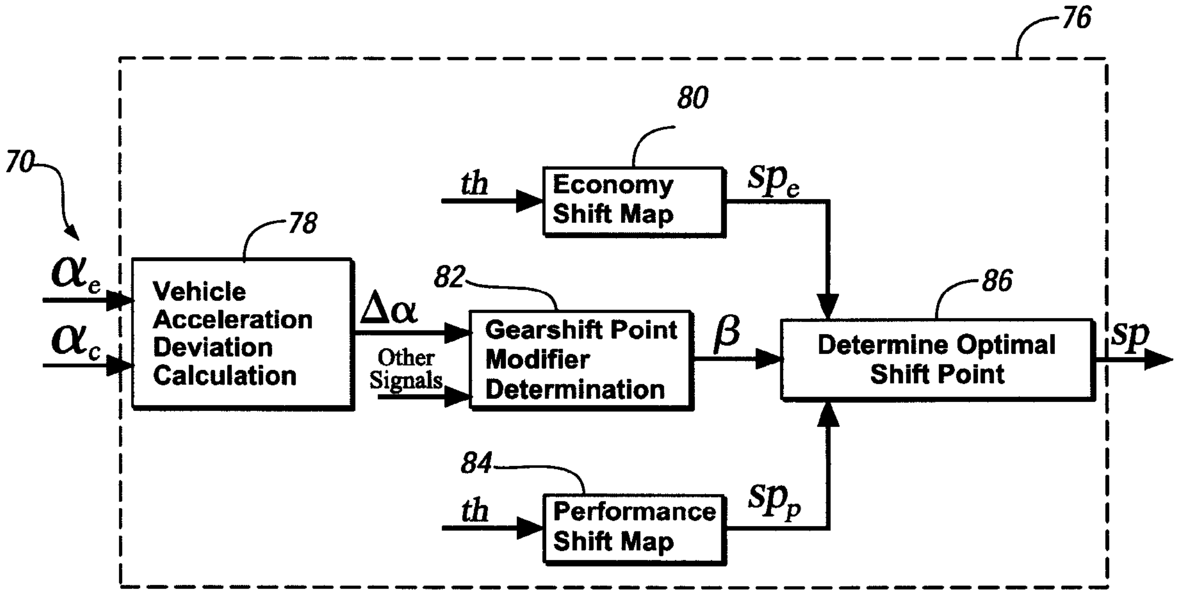
FIG. 4 is a flow chart illustrating substeps associated with determining an adaptive gearshift point shown in FIG. 3 in accordance with one embodiment of the invention.

FIG. 4 illustrates an adaptive gearshift point determination 76 from FIG. 3 in more detail. The gearshift map determination method 70 determines an adaptive gearshift point by inputting $\alpha_e$, and $\alpha_c$ into a vehicle acceleration deviation logic unit to calculate a vehicle acceleration deviation $\Delta\alpha$ (78).

Referring to FIGS. 2 and 4, the vehicle acceleration calculation logic 40 calculates the deviation $\Delta\alpha$ of the current vehicle acceleration $\alpha_c$ from the estimated nominal vehicle acceleration $\alpha_e$, wherein $\Delta\alpha$ equals a difference $\alpha_e$ and $\alpha_c$: $\Delta\alpha=\alpha_e-\alpha_c$.

Additionally, as shown in FIG. 4 at 82, an adaptive gearshift point modifier determination is made based on $\Delta\alpha$ and other input signals.

One embodiment of the gearshift point modifier determination logic 52 from FIG. 2 uses a lookup table to specify value of $\beta$ as a function of acceleration deviation $\Delta\alpha$ and engine throttle opening or position th, which is expressed in Equation 6.

$$\beta=f(\Delta\alpha, th) \quad (6)$$

Figure 9:
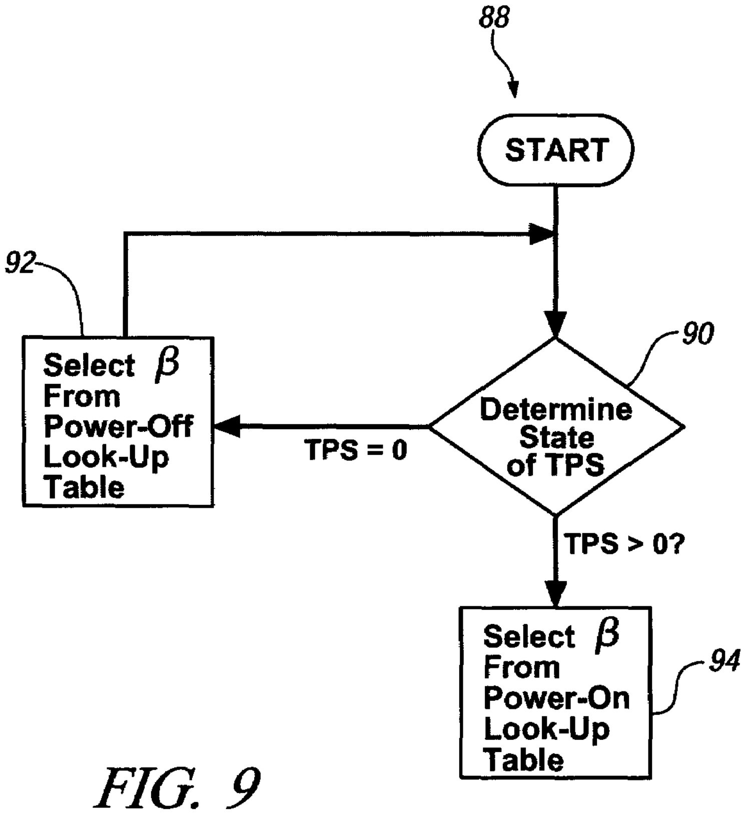
FIG. 9 is a flow chart illustrating the steps of determination of an adaptive gearshift point modifier in accordance with one embodiment of the invention.

FIG. 9 illustrates a flow chart 88 representing a method of determining an adaptive gearshift point modifier, $\beta$ 82 from FIG. 4. FIG. 9 illustrates in more detail use of the gearshift point modifier determination logic unit to determine $\beta$ as shown at 84 of FIG. 3. The flow chart 88 provides an initial state determination 90 that determines a state of a throttle position (TPS). The modifier $\beta$ varies in accordance with the TPS.

In one embodiment of the invention, β is selected from a look-up table such as one of the power-on or power-off look-up tables shown in FIGS. 7-8.

If the throttle position is greater than zero, then a β is selected from a power-on lookup table (94). If the throttle position is equal to zero then a β is selected from a power-off lookup table (92). State determination 90 is then repeated each time a throttle position changes a threshold position.

In another embodiment of the invention, β may be determined using fuzzy logic in the gearshift point modifier determination (82). Fuzzy logic may be used as an advanced control strategy as a method of programming control systems using human-type reasoning to dynamically determine β.

Fuzzy logic is a way to map an acceleration deviation Δα input to an output shift point modifier β.

Fuzzy logic is tolerant of imprecise data and nonlinearity. Membership functions varying between 0 and 1 may be used to define how each input can be mapped to a membership values. The membership function may be an arbitrary curve whose shape defines how each point in the input space is mapped to a membership value or degree of membership between 0 and 1. The mapping then provides a basis from which decisions can be made. Since decisions are based on the testing of rules, the rules must be combined in some manner to arrive at an output, methods of which are known in the art.

If needed, other inputs, such as brake signal, throttle rate, etc may also mapped using membership functions in a similar way.

Referring to FIGS. 2 and 4, once the inputs are input into the gearshift point determination logic 58, an optimal or adaptive gearshift point sp may be determined (86). An economy shift point, $sp_e$ is selected from the economy shift map 48 (80), a performance shift point $sp_p$ is selected from a performance shift map 50 (84), and a gearshift point modifier β is selected using the gearshift point modifier determination (82).

The values $sp_e$, $sp_p$, and β are then input into the gearshift point determination logic 58 to determine an adaptive shift point, sp, wherein the sp is calculated using Equation 7 (86).

$$sp=sp_e\cdot(1-\beta)+sp_p\cdot\beta \tag{7}$$

Wherein when β=0, then $sp=sp_e$, when β=1, then $sp=sp_p$, and when β takes a value between 0 and 1, sp ranges in value between and including $sp_e$ and $sp_p$. The calculation is performed for both up and down gearshift points from a current gear position. In the exemplary determination, the value for β between 0 and 1 is determined through a linear interpolation; however, other techniques may be used to provide the final value for β. Once gearshift point determination (76) as shown in FIGS. 3-4 is completed, then an adaptive shift map may be generated using the adaptive shift map logic 52 (102). The adaptive shift map is generated or determined (102) based on a plurality of optimal shift points corresponding to particular vehicle and road conditions. Each of the adaptive shift points and associated shift map are generated during each sampling time T.

The adaptive shift map is determined in accordance with the method shown in FIGS. 3-4 and is used to optimally schedule gearshifts in the transmission 26 in accordance with optimal adaptive gear shift points.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for controlling gear shifting in a fixed input-output multi-ratio automatic transmission coupled to an engine in a motor vehicle, comprising:

providing a first gearshift map for controlling gear shifting in the fixed input-output multi-ratio automatic transmission, wherein the first gearshift map comprises a plurality of first gearshift points;

providing a second gearshift map for controlling gear shifting in the fixed input-output multi-ratio automatic transmission, wherein the second gearshift map comprises a plurality of second gearshift points;

monitoring acceleration of the motor vehicle;

determining an acceleration deviation from a nominal vehicle acceleration;

determining a gearshift point modifier value corresponding to the acceleration deviation;

generating a third gearshift map for controlling gear shifting in the fixed input-output multi-ratio automatic transmission based upon the gearshift point modifier value, the first gearshift map, and the second gearshift map, wherein the third gearshift map comprises a plurality of third gearshift points calculated from corresponding first and second gear shift points and the gearshift point modifier value; and wherein each calculated third gearshift point has a value between and including the corresponding first and second gearshift points.

2. The method of claim 1, further comprising:

determining a first up-shift point from a current gear position based upon the first gearshift map;

determining a second up-shift point from the current gear position based upon the second gearshift map; and, generating an adaptive up-shift point from the current gear position based upon the first and second up-shift points and the gearshift point modifier value.

3. The method of claim 1, further comprising:

determining a first down-shift point from a current gear position based upon the first gearshift map;

determining a second down-shift point from the current gear position based upon the second gearshift map; and, generating an adaptive down-shift point from the current gear position based upon the first and second down-shift points and the gearshift point modifier value.

4. The method of claim 1, further comprising providing the first gearshift map for controlling gear shifting in the fixed input-output multi-ratio automatic transmission corresponding to a plurality of shift points at which the engine operates most efficiently.

5. The method of claim 4, further comprising providing the second gearshift map for controlling gear shifting in the fixed input-output multi-ratio automatic transmission corresponding to a plurality of shift points at which the engine operates at a maximum power condition.

6. The method of claim 1, further comprising generating the third gearshift map for controlling gear shifting in the fixed input-output multi-ratio automatic transmission based upon the gearshift point modifier value, the first gearshift map, and the second gearshift map during a sampling time during ongoing operation of the vehicle.

* * * * *